United States Patent
Watanabe et al.

(10) Patent No.: US 7,210,784 B2
(45) Date of Patent: May 1, 2007

(54) IMAGE PROJECTING DEVICE

(75) Inventors: Mitsuyoshi Watanabe, Gifu-ken (JP); Shoji Yamada, Aichi-ken (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 683 days.

(21) Appl. No.: 10/360,002

(22) Filed: Feb. 6, 2003

(65) Prior Publication Data
US 2003/0153835 A1 Aug. 14, 2003

(30) Foreign Application Priority Data
Feb. 6, 2002 (JP) ............................ 2002-029037

(51) Int. Cl.
*A61B 3/10* (2006.01)
(52) U.S. Cl. ..................... 351/221; 351/205
(58) Field of Classification Search ............... 351/200, 351/246, 221, 205; 345/7–9; 348/115, 750, 348/755, 757; 356/124; 359/196, 237
See application file for complete search history.

(56) References Cited

U.S. PATENT DOCUMENTS

| | | | |
|---|---|---|---|
| 3,632,184 A | 1/1972 | King ............................ 350/9 |
| 5,144,482 A | 9/1992 | Gould ........................ 359/478 |
| 5,345,262 A | 9/1994 | Yee et al. .................... 348/177 |
| 5,355,181 A | 10/1994 | Ashizaki et al. |
| 5,467,104 A * | 11/1995 | Furness et al. ................. 345/8 |
| 5,596,339 A * | 1/1997 | Furness et al. ................. 345/8 |
| 5,659,327 A * | 8/1997 | Furness et al. ................. 345/8 |
| 5,790,284 A * | 8/1998 | Taniguchi et al. ............. 345/8 |
| 6,008,781 A * | 12/1999 | Furness et al. ................. 345/8 |
| 6,088,102 A * | 7/2000 | Manhart ..................... 356/499 |
| 6,177,966 B1* | 1/2001 | Masuda et al. ................. 349/8 |
| 6,281,862 B1 | 8/2001 | Tidwell et al. |
| 6,538,625 B2* | 3/2003 | Tidwell et al. ................. 345/8 |
| 6,657,763 B2* | 12/2003 | Kobayashi .................... 359/212 |
| 2002/0141023 A1 | 10/2002 | Yamada et al. |
| 2003/0109860 A1* | 6/2003 | Black .......................... 606/10 |
| 2004/0196213 A1* | 10/2004 | Tidwell et al. ................. 345/8 |

FOREIGN PATENT DOCUMENTS

| | | |
|---|---|---|
| EP | 0 785 457 A2 | 7/1997 |
| EP | 0 871 055 A2 | 10/1998 |
| GB | 2 171 535 A | 8/1986 |
| JP | 2874208 B2 | 4/1991 |
| JP | HEI 4 285993 | 10/1992 |
| JP | 2932636 | 5/1999 |

* cited by examiner

*Primary Examiner*—Scott J. Sugarman
(74) *Attorney, Agent, or Firm*—Day Pitney LLP

(57) ABSTRACT

A wavefront curvature modulating device is provided with a beam generating system that emits a plurality of beams having different wavefront curvatures, and a beam selecting system that selects at least one of the beams generated by the beam generating system.

13 Claims, 9 Drawing Sheets

FIG. 6
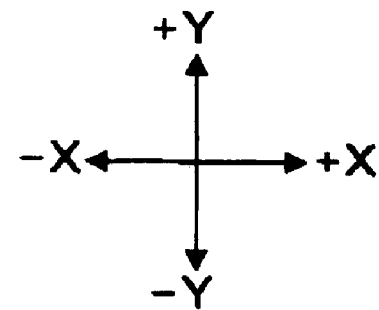
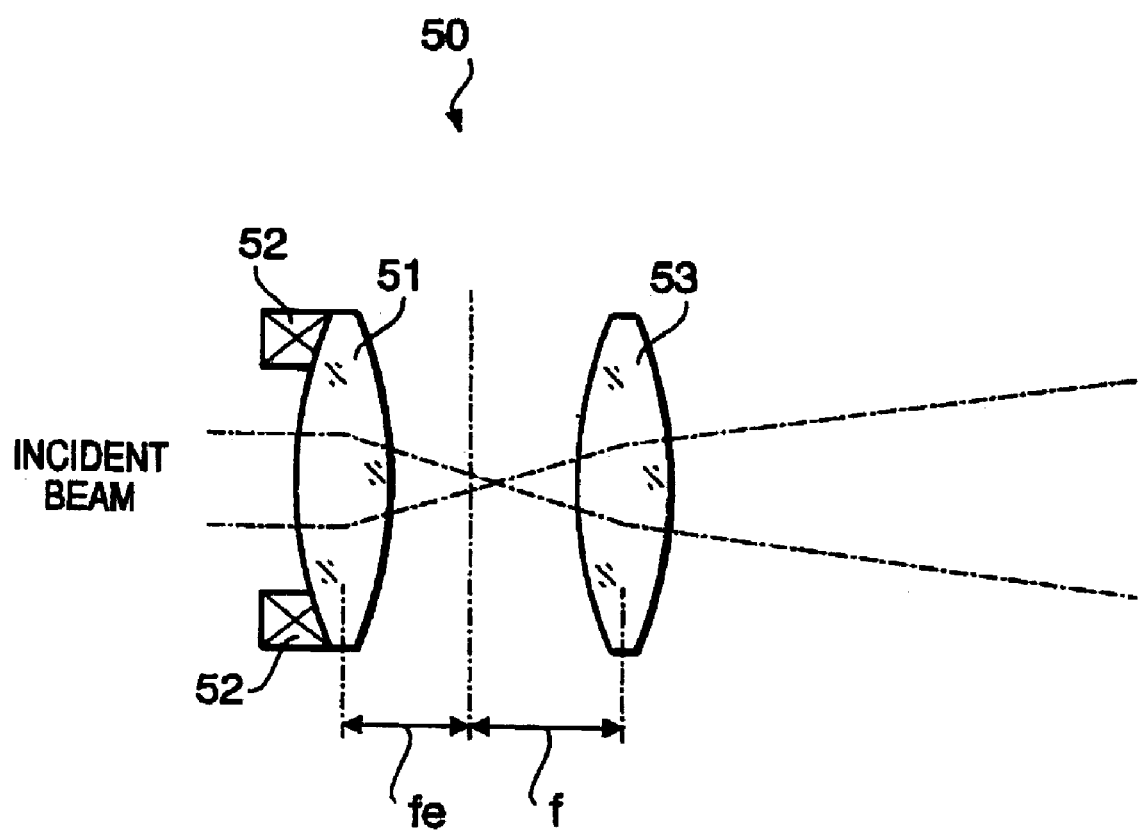

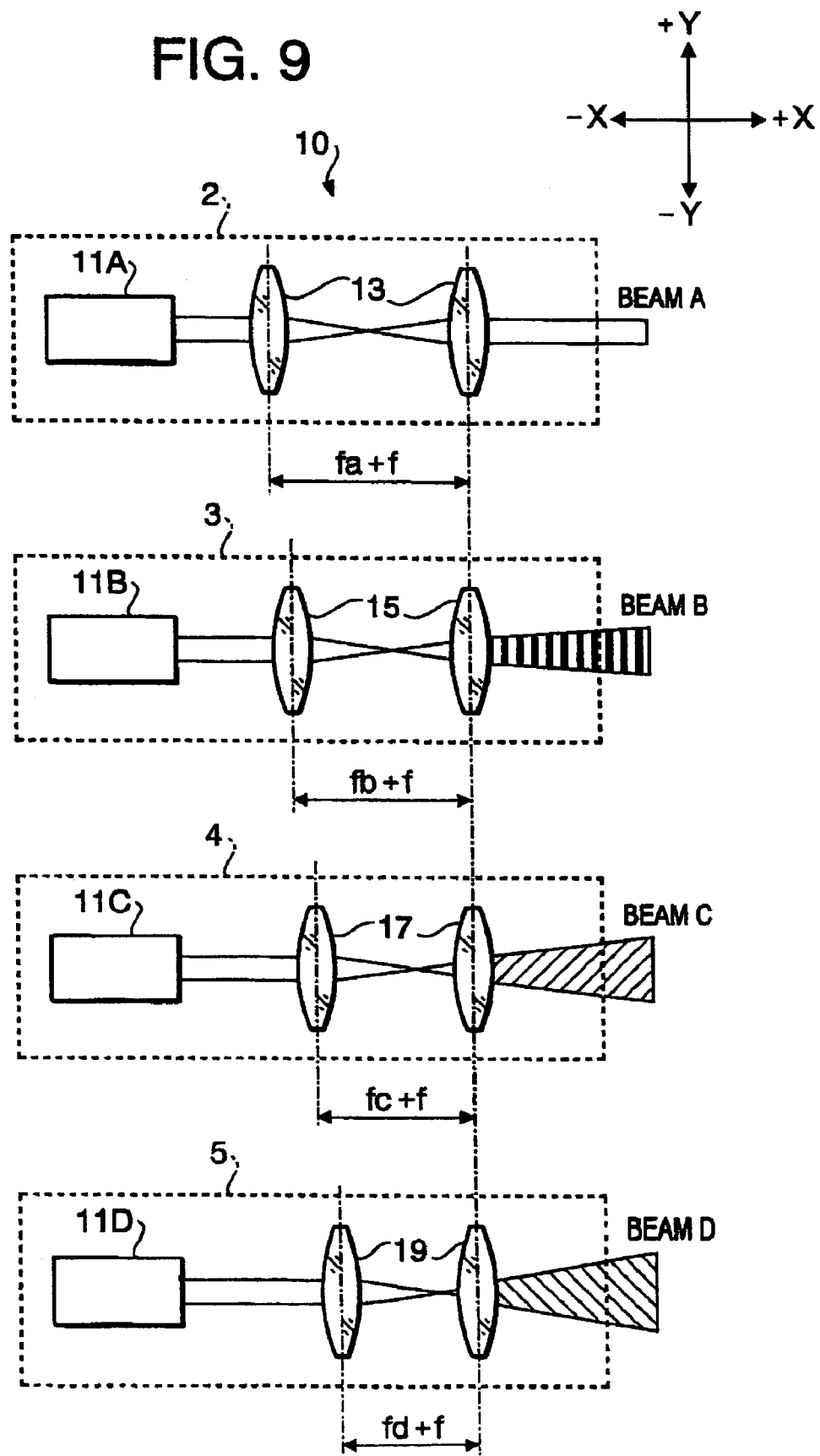

IMAGE PROJECTING DEVICE

BACKGROUND OF THE INVENTION

The present invention relates to an image projecting device which emits a scanning light beam into an eye of an observer to form an image on retina.

Conventionally, a retinal scanning display device which directly projects image on a retina by scanning weak light beams has been developed. The assignee of the present invention has suggested such a display device in Japanese Patent Publication No. 2874208. Such a retinal scanning display is typically known as a head-mounting display, which is configured such that an observer wears the display device, like spectacles, on the head. The retinal scanning display device is implemented with a wavefront curvature modulator which dynamically varies the wavefront curvature of the beam in order to provide a depth of the image formed on the retina of the observer.

Light emitted by a light source propagates as a light wave in all directions at the same phase, i.e., as isophase spherical wave. Depending on a distance between the light source and an observer, the radius of curvature of the spherical wave at the observer is different. That is, if the light source is close to the observer, an image of the light source is projected on the retina of the observer as an image having a small radius of curvature, while if the light source is remote, the image of the light source is projected on the retina of the observer as an image having a relatively large radius of curvature of the wavefront. The observer recognizes the difference of the radius of curvature and recognizes a natural perspective, or three-dimensional feelings.

In the conventional wavefront curvature modulator for a retinal scanning display, an optical system thereof is provided with a piezoelectric plate formed with a reflection surface thereon. A control voltage is applied to the piezoelectric plate so that the piezoelectric plate, and therefore the reflection surface is deformed. The light beam emitted by the light source is directed to the reflection surface, and the reflected beam is used for the retinal scanning. In this conventional wavefront curvature modulator, due to the deformation of the reflection surface (i.e., the piezoelectric plate), the wavefront curvature of the reflected beam is different from that of the incident beam. By varying the control voltage, the degree of change of the wavefront curvature of the reflected beam can be controlled. Recently, there is a requirement for an improved wavefront curvature modulating device which is capable of modulating the wavefront curvature at a higher frequency than the conventional device.

SUMMARY OF THE INVENTION

The present invention is advantageous in that the wavefront curvature of a beam can be modulated at high frequency which has not been achieved in the conventional wavefront curvature modulator.

According to an aspect of the invention, there is provided a wavefront curvature modulating device, which is provided with a beam generating system that emits a plurality of beams having different wavefront curvatures, and a beam selecting system that selects at least one of the beams generated by the beam generating system.

Optionally, the beam selecting system may include a plurality of intensity modulators that modulates intensities of the plurality of beams generated by the beam generating system, respectively.

Further optionally, the beam selecting system may include a beam combining system capable of combining the plurality of beam into a single combined beam. Thus, the combined beam may includes a plurality of components having different wavefront curvatures.

Still optionally, the beam selecting system may include an optical switch system that selects at least one of the plurality of beams.

Furthermore, the beam generating system may include a wavefront curvature modulating system which is capable of modulating the wavefront curvatures of the plurality of beams individually.

In this case, the wavefront curvature modulating system may be configured to modulate a radius of wavefront curvature within a range of 10 cm through the infinity using the plurality of beams.

Further optionally, each of the plurality of beams having the different wavefront curvatures may include a plurality of components having different wavelengths. For example, each beam may include wavelength components of red, blue and green.

Further, the beam emitting system may include a beam divider that divides at least one beam emitted by a single light source into the plurality of beams, and a converting system that converts the plurality of beams divided by the beam divider into the beams having different wavefront curvatures, respectively.

According to anther aspect of the invention, there is provided a retinal display device having a wavefront curvature modulating device configured as above.

Optionally, the retinal display device may include a scanning system that scans the beam emitted by the wavefront curvature modulating device, and an optical system that directs the beam scanned by the scanning system into an eye of an observer.

Further optionally, the retinal display device may include a virtual image projection device that generate image data representative of a three-dimensional object by projecting the three-dimensional object on a plurality of virtual planes at different distances with respect to a virtual observing point representing an observing point of the observer.

In this case, when the observer focuses on one of the plurality of virtual planes, distances to two planes closer to and farther from the one of the plurality of virtual planes are determined such that blurs of the images formed on the two planes due to out-of-focus state thereof are substantially the same.

Alternatively, when the observer focuses on one of the plurality of virtual planes, distances between the plurality of virtual planes are determined such that a blur of the image formed on the virtual plane next to the one of the plurality of virtual planes substantially corresponds to the visual resolution of the observer.

Further, the virtual image projecting device may be configured to project, in addition to the two-dimensional images projected on the plurality of virtual planes, image data including depth data and/or image data of three-dimensional shape represented by polygons on the virtual planes.

Still optionally, the virtual image projecting device may be configured to project portions of a three-dimensional object viewed from the virtual observing point on one of the plurality of virtual planes corresponding to a distance between the observing point to the portion of the three-dimensional object.

Optionally, the beam generating system may include a plurality of laser sources that emit a plurality of laser beams, respectively and a plurality of wavefront curvature modulating systems that modulate the plurality of laser beams emitted by the plurality of laser sources so as to have different wavefront curvature, respectively.

BRIEF DESCRIPTION OF THE ACCOMPANYING DRAWINGS

FIG. 1 shows a configuration of a wavefront curvature modulating device to which embodiments of the invention can be applied;

FIG. 2 schematically shows a structure of a beam generating system;

FIG. 6 shows a modification of a lens system employed in the beam generating system;

FIG. 9 is an alternative configuration of the beam generating system.

DESCRIPTION OF THE EMBODIMENTS

Hereinafter, wavefront curvature modulating devices according to embodiments will be described with reference to the accompanying drawings.

Figure 1:
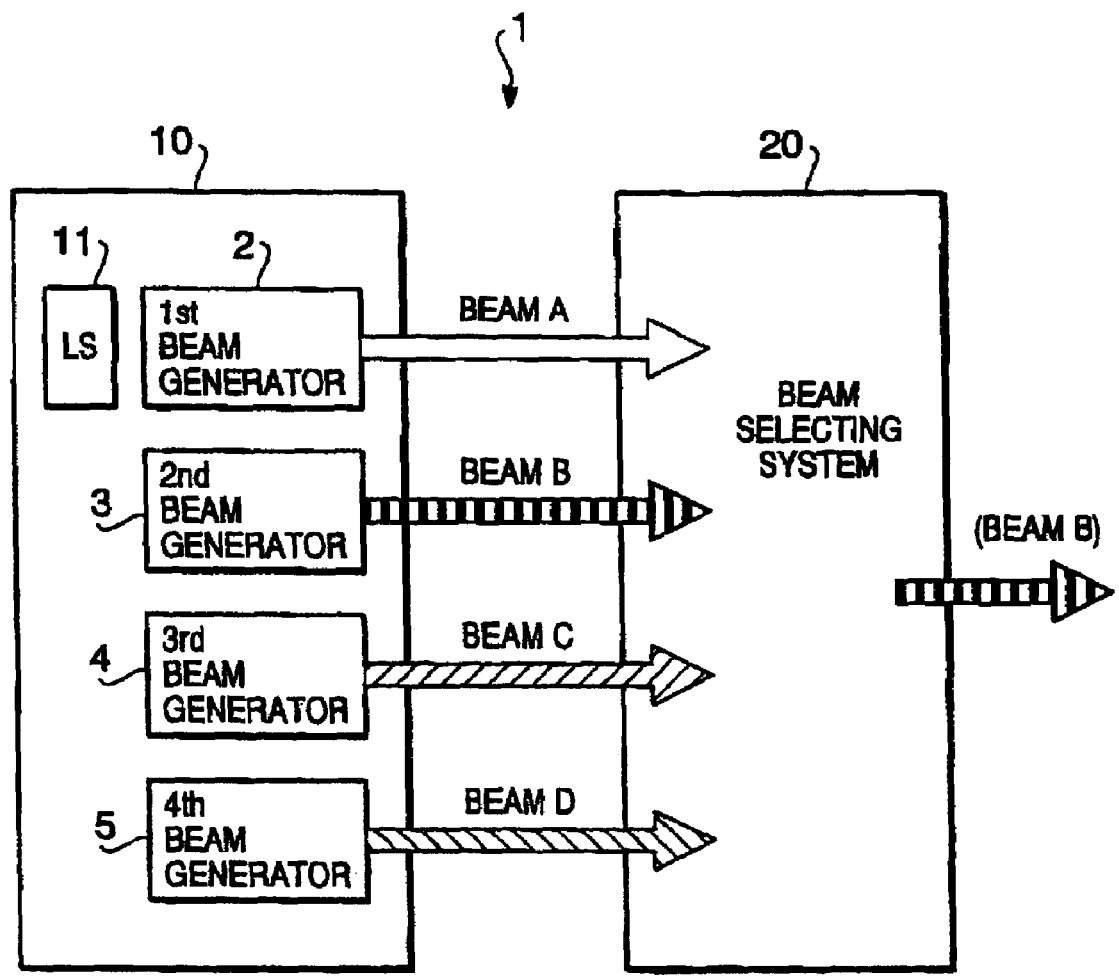
Figure 2:
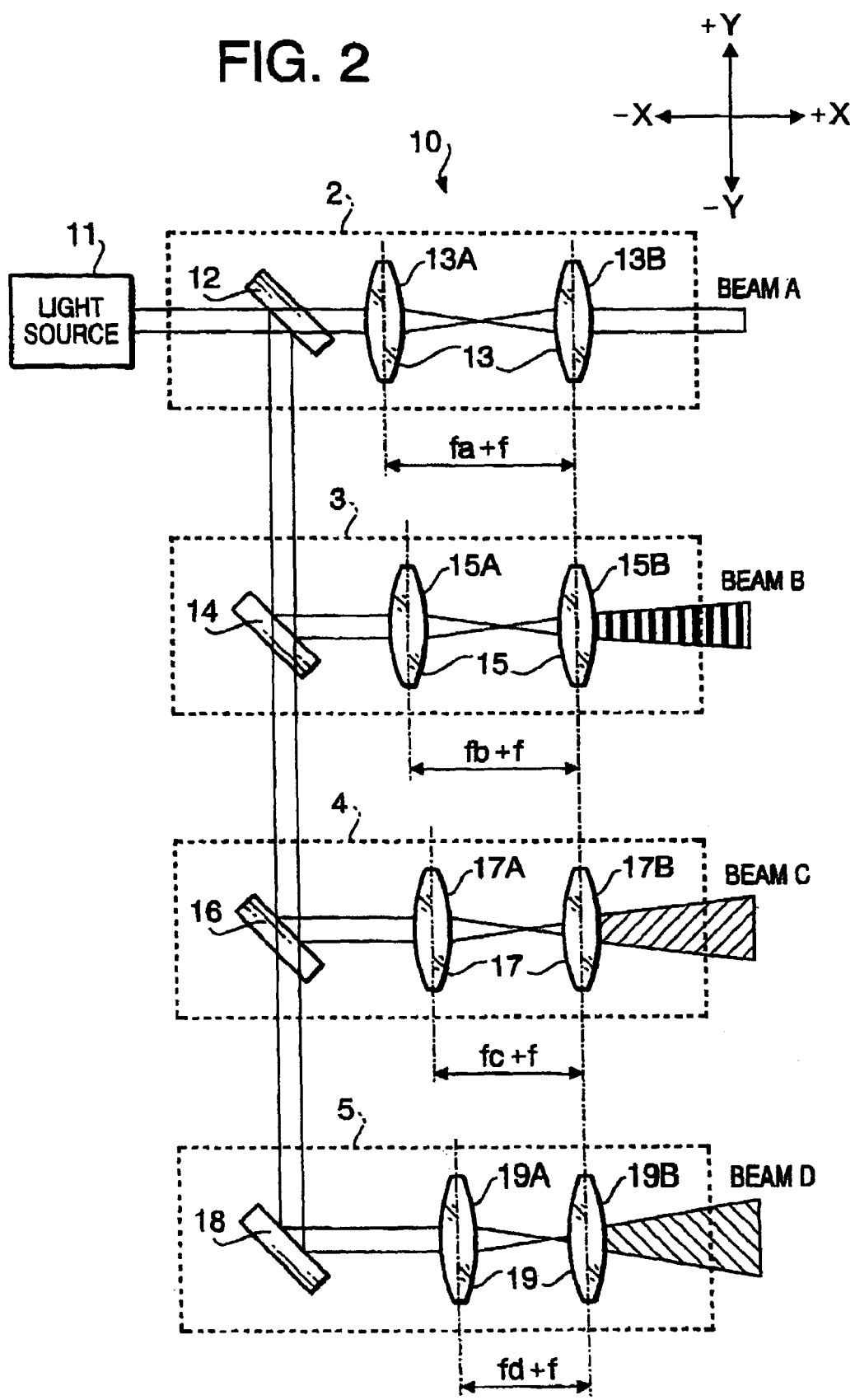

FIG. 1 shows a configuration of a wavefront curvature modulating device (hereinafter referred to as WCM) 1 to which embodiments of the invention can be applied. FIG. 2 schematically shows a structure of a beam generating system 10 employed in the WCM 1 shown in FIG. 1.

As shown in FIG. 1, the WCM 1 includes the beam generating system 10 and a beam selecting system 20. The beam generating system 10 is configured to emits four beams having different wavefront curvatures. The beam selecting system 20 receives all the beams generated by the beam generating system 10, and select at least one of the received beams, and directs the same to outside.

Specifically, the beam generating system 10 includes a light source 11 that emits a beam having substantially parallel rays of light, and first through fourth beam generators 2, 3, 4 and 5 that generate beams A through D whose wavefront curvatures are a, b, c and d, respectively.

As the light source 11, it is preferable that a laser diode is employed since the substantially parallel light should be incident on each of the beam generators 2, 3, 4 and 5. However, the invention is not limited to such a structure, and any other light source such as an LED (light emitting diode) may be used in combination of appropriate optical systems.

As shown in FIG. 2, the first beam generator 2 includes a first semi-transparent mirror 12 and a first lens system 13. The first semi-transparent mirror 12 reflects a part of the incident beam, and allows the remainder of the incident beam to pass therethrough. The part of the beam passed through the first semi-transparent mirror 12 is incident on the first lens system 13. It should be noted that an axis of the beam emitted by the light source 11 and passed through the first semi-transparent mirror 12 coincides with the optical axis of the first lens system 13.

Hereinafter, the direction parallel with the optical axis of the first lens system 13 will be referred to as an X-axis direction, and the light source side (i.e., the left-hand side in FIG. 2) along the X axis will be referred to as an −X direction, while the right-hand side along the X axis will be referred to as a +X direction. The first lens system 13 is configured such that the beam passed therethrough has the wavefront curvature of a.

Along the axis of the beam reflected by the first semi-transparent mirror 12, second and third semi-transparent mirrors 14 and 16, and a mirror (a total reflection mirror) 18 are arranged. A direction along the axis of the beam reflected by the first semi-transparent mirror 12 will be referred to as a Y-axis. According to the embodiments, the X-axis and the Y-axis are perpendicular to each other.

The second beam generator 3 includes the second semi-transparent mirror 14 and a second lens system 15, which are arranged such that the beam reflected by the first semi-transparent mirror 12 is partially reflected, in the X-axis direction, by the second semi-transparent mirror 14 and enters the second lens system 15 along the optical axis thereof, which is parallel with the X-axis. The second lens system 15 is configured such that the beam passed therethrough has the wavefront curvature of b.

The third beam generator 4 includes the third semi-transparent mirror 16 and a third lens system 17, which are arranged such that the beam reflected by the first semi-transparent mirror 12 and passed through the second semi-transparent mirror 14 is partially reflected, in the X-axis direction, by the third semi-transparent mirror 16 and enters the third lens system 17 along the optical axis thereof, which is parallel with the X-axis. The third lens system 17 is configured such that the beam passed therethrough has the wavefront curvature of c.

The fourth beam generator 5 includes the mirror 18 and a fourth lens system 19, which are arranged such that the beam reflected by the first semi-transparent mirror 12, passed through the second and third semi-transparent mirrors 14 and 16 is partially reflected, in the X-axis direction, by the mirror 18 and enters the fourth lens system 19 along the optical axis thereof, which is parallel with the X-axis. The fourth lens system 19 is configured such that the beam passed therethrough has the wavefront curvature of d.

Each of the lens systems 13, 15, 17 and 19 consists of two positive (convex) lenses, each of which has a focal length of f. Further, the first through fourth lens systems 13, 15, 17 and 19 are configured such that distances between principal points of the two lenses are fa+f, fb+f, fc+f and fd+f, respectively, where, $$fa = f \ldots \quad (1), \text{ and}$$

$$fa > fb > fc > fd > 0 \ldots \quad (2).$$

As shown in FIG. 2, the beam emitted by the light source 11 is divided into four beams by the first through third semi-transparent mirrors 12, 14 and 16 and the total reflection mirror 18. The divide four beams are incident on the first through fourth lens systems 13, 15, 17 and 19, respectively.

The lens system 13 is configured such that the two lenses, each of which has a focal length of f, are arranged such that a distance between the principal points thereof is fa+f, where fa is equal to f. Thus, the distance of the principal points of the two lenses of the first lens system 18 is twice the focal length f. Accordingly, the beam incident on the left-hand side lens (hereinafter referred to as a first lens 13A) in FIG. 2 converges at the central position between the two lenses, and then enters the right-hand side lens (hereinafter referred to as a second lens 13B) as a diverging beam. Since the converging point of the beam is the focal point of the second lens 13B, the beam A that emerges from the second lens 13B is a collimated beam, which is the same as the beam incident on the first lens 13A. Since the beam A is collimated, the wavefront curvature a is substantially zero (i.e., the radius of the wavefront curvature is infinity).

The beam reflected by the second semi-transparent mirror 14 is incident on the second lens system 15. As aforementioned, a distance between the principal points of the first and second lenses of the second lens system 15 is fb+f, where fb is less than fa. Thus, the parallel light beam incident on a first lens 15A of the lens system 15 is converged at a point which is closer to a second lens 15B than the focal point of the second lens 15B. The beam converged by the first lens 15A of the lens system 15 is incident on the second lens 15B as a diverging beam. Since the converging point is closer to the second lens 15B than the focal point thereof, the beam B emerges from the second lens 15B as a diverging beam. Accordingly, the wavefront curvature b of the beam B is greater than the wavefront curvature a of the beam A.

Similarly, the beam C emerging from a second lens 17A of the lens system 17, and the beam C emerging from the second lens 17B of the lens system 19 are diverging beams. Since the condition (2) is satisfied, the degree of divergence of the beam C is greater than that of the beam B, and the degree of divergence of the beam D is greater than that of the beam C. Therefore, the wavefront curvature c of the beam C is greater than the wavefront curvature b of the beam B, and the wavefront curvature d of the beam D is greater than the wavefront curvature c of the beam C. That is, wavefront curvature a<wavefront curvature b<wavefront curvature c<wavefront curvature d. Accordingly, from the beam generating system 10, four beams A–D having different wavefront curvatures a–d are emitted.

In view of the sensitivity of the retina regarding the wavefront curvatures, it is not necessary to continuously vary the wavefront curvature. By providing a limited number of (e.g., four steps of) different wavefront curvatures, for example, by providing logarithmically varying radii of the wavefront curvatures of 10 cm, 50 cm, 3 m and infinity, practically sufficient three-dimensional effect can be achieved.

Hereinafter, three embodiments of the beam selecting systems will be described. In the following description, the beam selecting systems are assigned with reference numerals 20A, 20B and 20C, respectively, each of which can be employed as the beam selecting system 20 described above.

FIRST EMBODIMENT

Figure 3:
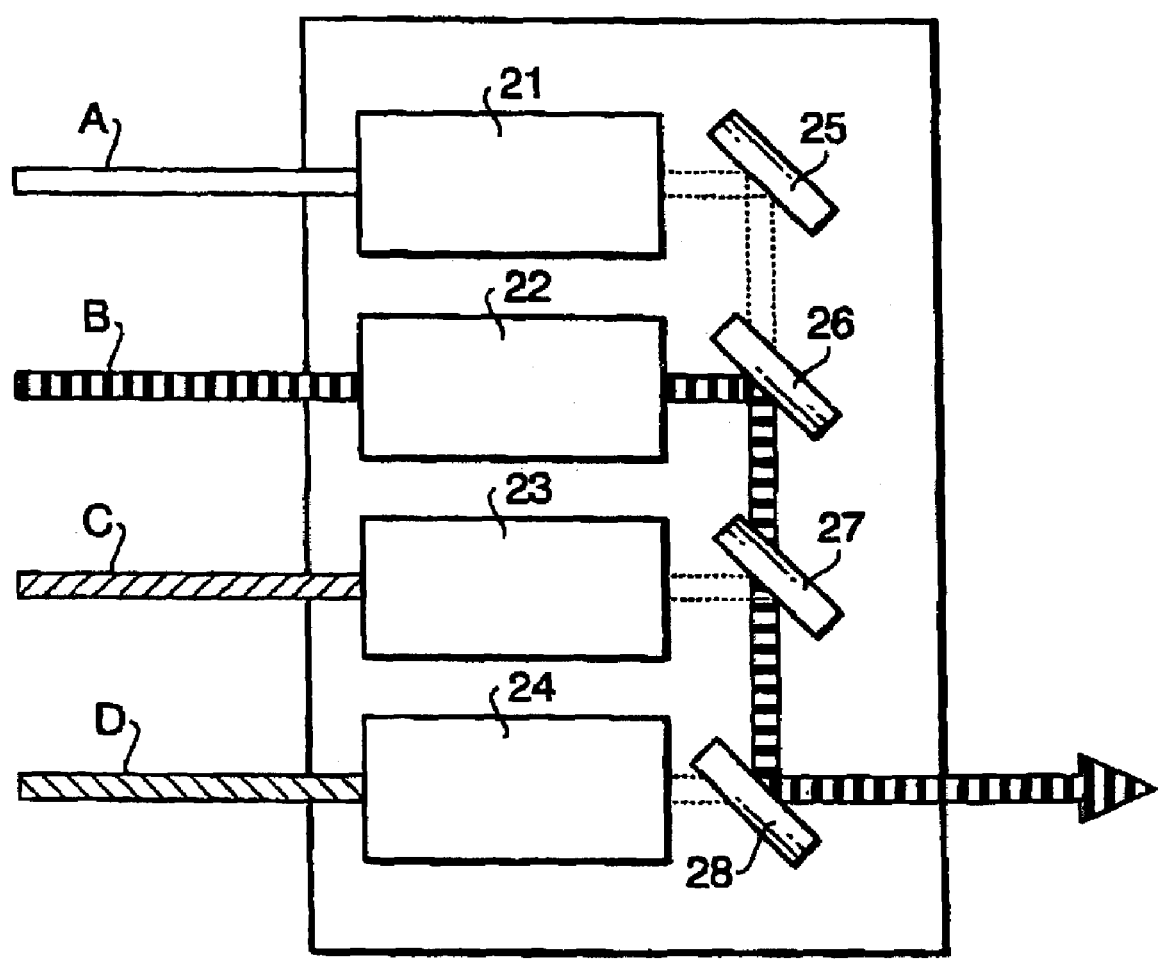
FIG. 3 shows a structure of a beam selecting system according to a first embodiment of the invention.

FIG. 3 shows a structure of a beam selecting system 20A according to the first embodiment of the invention.

As shown in FIG. 3, the beam selecting system 20A includes first through fourth intensity modulators 21, 22, 23 and 24. Each of the intensity modulators 21, 22, 23 and 24 is configured to modulate the intensity of the incident beam in accordance with an electrical signal applied thereto. An example of such an intensity modulator is an AOM (Acousto-Optical Modulator), with which the intensity of the beam can be modulated at a frequency of hundreds of megahertz.

The beam A emitted by the first beam generator 2 enters the first intensity modulator 21, and is modulated thereby. Then, the beam A modulated by the first intensity modulator 21 emerges therefrom and is incident on a total reflection mirror 25. It should be noted that the first intensity modulator 21 and the total reflection mirror 25 are arranged along the axis of the beam A, which is parallel with the X-axis.

The beam B emitted by the second beam generator 3 enters the second intensity modulator 22, and is modulated thereby. Then, the beam B modulated by the second intensity modulator 22 emerges therefrom and is incident on a first beam combining mirror 26. It should be noted that the second intensity modulator 22 and the first beam combining mirror 26 are arranged along the axis of the beam B, which is parallel with the X-axis.

Similarly, the beam C emitted by the third beam generator 4 enters the third intensity modulator 23, and is incident on a second beam combining mirror 27, the third intensity modulator 23 and the second beam combining mirror 27 being arranged along the axis of the beam C, which is parallel with the X-axis.

The beam D emitted by the fourth beam generator 5 enters the fourth intensity modulator 24, and is incident on a third beam combining mirror 28, the fourth intensity modulator 24 and the third beam combining mirror 28 being arranged along the axis of the beam D, which is parallel with the X-axis.

The mirrors 25 through 28 are arranged along the Y-axis. Each of the beam combining mirrors 26, 27 and 28 is configured to reflects part of incident light and transmits the remaining part of the incident light. Further, the first through fourth intensity modulators 21, 22, 23 and 24 and the mirrors 25, 26, 27 and 28 are arranged such that the axes of the beams A, B and C reflected by the third beam combining mirror 28 coincide with the axis of the beam D passed through the third combining mirror 28.

Each of the intensity modulators 21 through 24 is controlled by a beam selecting system driving circuit 63 (see FIG. 7, which will be described later) to change its transparency so that the intensity of the beam passed therethrough is changed.

The beams A through D respectively passed through the intensity modulators 21 through 24 are combined by the mirrors 25 through 28, and a combined beam emerges from the beam selecting system 20A.

Specifically, the first through fourth intensity modulators 21 through 24 are driven such that only one modulator transmits the beam and the other three modulators shield the beams incident thereon. With this configuration, only one of the beams A through D can be selected, which emerges from the beam selecting system 20A. FIG. 3 shows a case where the beams A, C and D are shielded and the beam B emerges from the beam selecting system 20A via the second intensity modulator 22.

Alternatively, the intensities of the beams A through D can be adjusted separately so that a beam including a plurality components having different wavefront curvatures emerges from the beam selecting system 20A.

For example, it is possible that the beams B and C may be combined with the intensity ratio is one to one, and emitted from the beam selecting system 20A. In such a case, an observer may recognize that an image is formed on a virtual plane which is located between virtual planes respectively corresponding to the wavefront curvatures b and c. Further, by setting the ratios of the intensities of the beams to be combined appropriately, the virtual plane of an image can be located at a desired position. Therefore, with the configuration of the beam selecting system 20A, the same effect as a case where the wavefront curvature is continuously changed can be achieved.

Some types of the intensity modulators affect the wavefront curvature. An example of such a modulator is the AOM, which disturbs the wavefront of a beam passed therethrough. If such intensity modulators are employed, it may be effective to arrange the intensity modulators between the lens systems 13, 15, 17 and 19, and the mirrors 12, 14, 16 and 18, respectively. With this configuration, the function of intensity modulation can be achieved.

Alternative to the above configuration, as shown in FIG. 9, four laser diodes 11A–11D may be arranged on the upstream side of the lens systems 13, 15, 17 and 19, respectively, as light sources. By controlling the intensities of the beams emitted by the four laser diodes 11A–11D, the intensity modulators 21 through 24 can be omitted, and the same effects as the beam selecting system 20A can be achieved.

SECOND EMBODIMENT

Figure 4:
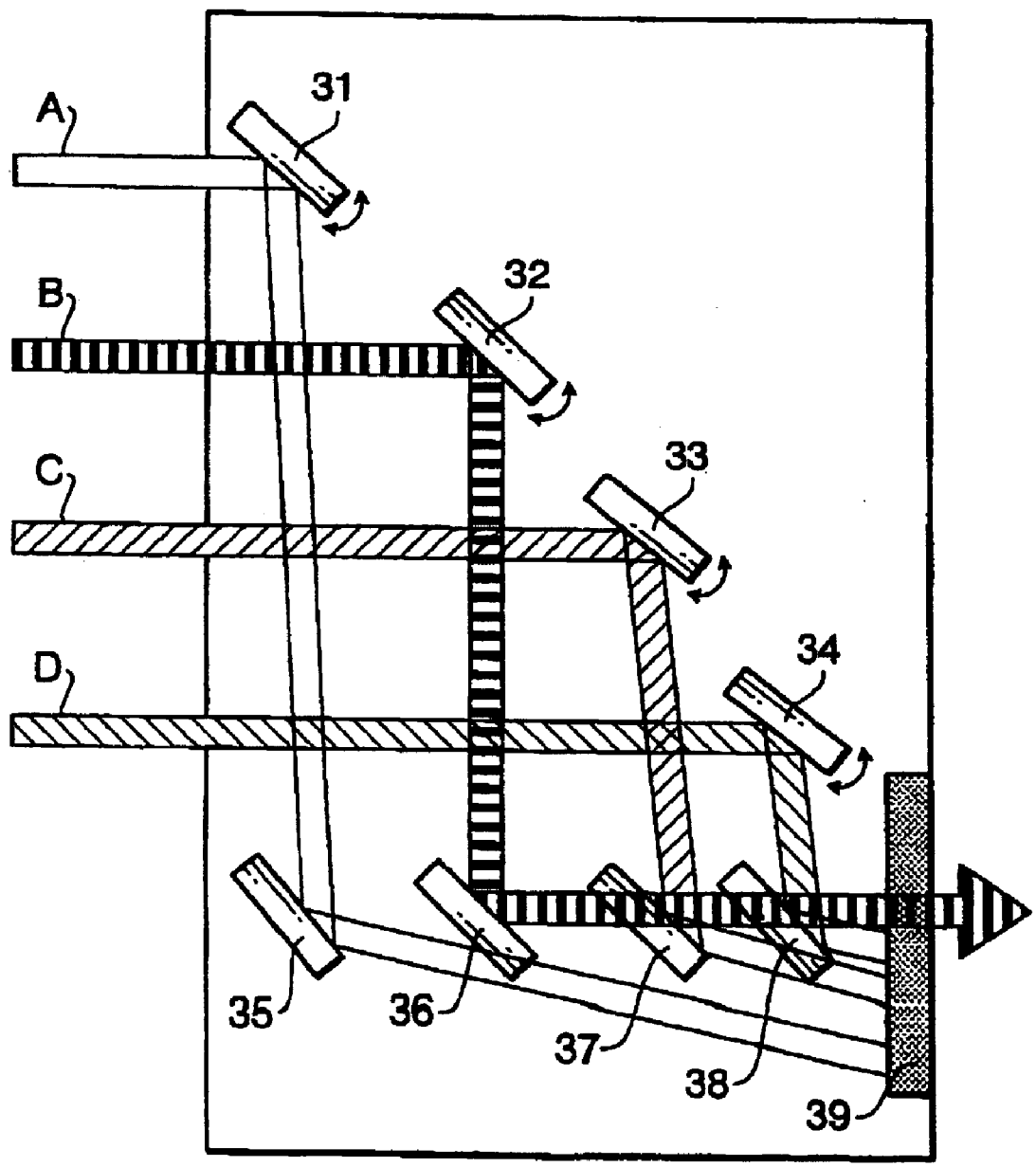
FIG. 4 shows a structure of a beam selecting system according to a second embodiment of the invention.

FIG. 4 shows a structure of a beam selecting system 20B according to a second embodiment of the invention;

As shown in FIG. 4, the beam selecting system 20B includes first through fourth optical switches 31, 32, 33 and 34, which are arranged on the axes or the beams A, B, C and D, respectively. The optical switches 31, 32, 33 and 34 are configured to reflect the beams A, B, C and D, and the reflection directions are changeable, respectively. The beam selecting system 20B further includes a total reflection mirror 35, first through third beam combining mirrors 36, 37 and 39. The beams A, B, C and D reflected by the first through fourth optical switches 31, 32, 33 and 34 are directed to the mirrors 35, 36, 37 and 38, respectively. The beam selecting system 20B is also provided with a slit member 39 formed with a slit 39S. The mirrors 35, 36, 37 and 38, and the slit 39S are arranged along the X-axis.

As the optical switches 35, 37, 37 and 38, a silicon micro-mirror array can be used. In this case, the optical switches can be fabricated in accordance with a semiconductor fabricating process such as a silicon micro-fabrication process. With such a configuration, the beam selecting system 20B can be downsized, thereby the entire device (i.e., the wavefront curvature modulating device 1) can also be downsized.

When the first optical switch 31 is positioned such that the beam A reflected thereby is reflected by the total reflection mirror 35 and proceeds in the X-axis direction, a part of the beam A reflected by the total reflection mirror 35 passes through the first through third beam combining mirrors 36, 37 and 38, and emerges from the slit 39S. If the first optical switch 31 is positioned such that the beam A is reflected in another direction (i.e., is inclined with respect to the X-axis), the beam A reflected by the total reflection mirror 35 does not pass through the slit 39S and shielded by the slit member 39, which is formed to be a light shielding member.

When the second optical switch 32 is positioned such that the beam B reflected thereby is reflected by the first beam combining mirror 36 and proceeds in the X-axis direction, a part of the beam B reflected by the first beam combining mirror 36 passes through the second and third beam combining mirrors 37 and 38, and emerges from the slit 39S. If the second optical switch 32 is positioned such that the beam B is reflected in another direction, the beam B reflected by the first beam combining mirror 36 does not pass through the slit 39S.

Similarly, when the third optical switch 33 is positioned such that the beam C reflected thereby is reflected by the second beam combining mirror 37 and proceeds in the X-axis direction, a part of the beam C reflected by the second beam combining mirror 37 passes through the third beam combining mirror 38, and emerges from the slit 39S. If the third optical switch 33 is positioned such that the beam C is reflected in another direction, the beam C reflected by the second beam combining mirror 37 does not pass through the slit 39S.

When the fourth optical switch 34 is positioned such that the beam D reflected thereby is reflected by the third beam combining mirror 38 and proceeds in the X-axis direction, a part of the beam D reflected by the third beam combining mirror 38 emerges from the slit 39S. If the fourth optical switch 34 is positioned such that the beam D is reflected in another direction, the beam D reflected by the third beam combining mirror 38 does not pass through the slit 39S.

By adjusting the reflection direction of each of the optical switches 31 through 34, each of the beams A through D can be directed to the slit 39S or not. Therefore, it is possible to let only one of the beams A through D pass through the slit 39S. Further, since the optical switches 31 through 34 are controlled individually, it is also possible to allow two or more beams to pass through the slit 39S as a combined beam. In the latter case, as in the first embodiment, the wavefront curvature corresponding to the combined beams can be provided.

Since the slit 39S is formed such that the beam passes therethrough only when the beam proceeds along the X-axis, and if the axis of the beam inclined with respect to the X-axis, the beam does not pass through the slit 39S, each of the optical switches 31 through 34 is only required to change the reflection direction within a relatively small range. It should be noted that the optical switches 31 through 34 may be controlled by the driving circuit 63 shown in FIG. 7.

THIRD EMBODIMENT

Figure 5:
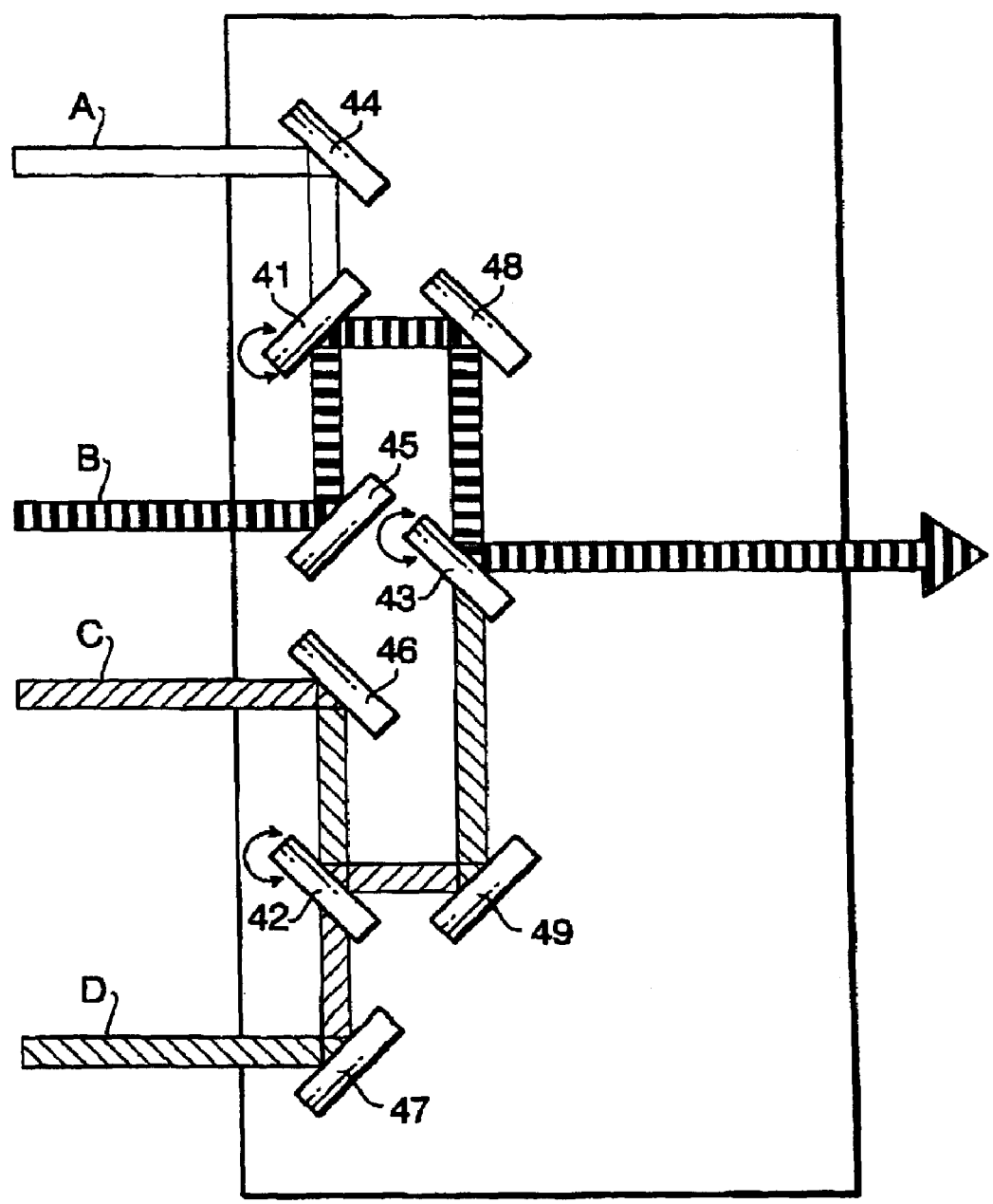
FIG. 5 shows a structure of a beam selecting system according to a third embodiment of the invention.

FIG. 5 shows a structure of a beam selecting system 20C according to a third embodiment of the invention.

As shown in FIG. 5, the beam selecting system 20C includes first through fourth fixed mirrors 44, 45, 46 and 47, which are aligned along the Y-axis, and respectively located on the axes of the beams A, B, C and D. The first mirror 44 reflects the beam A in the −Y direction, while the second mirror 45 reflects the beam B in the +Y direction. The axes of the beams A and B respectively reflected by the first and second mirrors 44 and 45 coincide with each other.

Similarly, the third mirror 46 reflects the beam C in the −Y direction, while the fourth mirror 47 reflects the beam D in the +Y direction. The axes of the beams C and D respectively reflected by the third and fourth mirrors 46 and 47 coincide with each other.

Between the first and second mirrors 44 and 45, along the Y-axis, a first optical switch 41 is arranged. The first optical switch 41 is configured to selectively reflects the beam A or beam B to a fixed mirror 48. The optical switch 41 and the fixed mirror 48 are arranged along the X-axis.

Between the third and fourth mirrors 46 and 47, along the Y-axis, a second optical switch 42 is arranged. The second optical switch 42 is configured to selectively reflects the beam C or beam D to a fixed mirror 49. The optical switch 42 and the fixed mirror 49 are arranged along the X-axis.

The fixed mirrors 48 and 49 are arranged along the Y-axis, and the axis of the beam A or B reflected by the fixed mirror 48 and the axis of the beam C or D reflected by the fixed mirror 49 coincide with each other.

Between the fixed mirrors 48 and 49, along the Y-axis, a third optical switch 43 is arranged. The beam A or the beam B incident on the fixed mirror 48 is reflected thereby to the third optical switch 43. Similarly, the beam C or the beam D incident on the fixed mirror 49 is reflected thereby to the third optical switch 43.

The third optical switch 43 is configured to selectively reflects the beam A or B reflected by the fixed mirror 48, or the beam C or D reflected by the fixed mirror 49 to emerge from the beam selecting system 20C along the X-axis.

It should be noted that each of the optical switches 41, 42 and 43 is composed of, for example, the silicon micro-mirror array, which is capable of performing switching operation at a high speed. By controlling the switching operations of the first through third optical switches 41, 42 and 43, a desired one of the beams A through D can be selected to emerge from the beam selecting system 20C.

In the beam selecting system 20C shown in FIG. 5, the optical switch 41 is controlled by the beam selecting system driving circuit 63 (see FIG. 7) such that one of the beams A and B is selectively directed to the mirror 48. Similarly, the optical switch 42 is controlled by the driving circuit 63 (see FIG. 7) such that one of the beams C and D is selectively directed to the mirror 49. Further, the optical switch 43 is controlled by the driving circuit 63 (see FIG. 7) such that one of the beams reflected by the mirrors 48 and 49 is selected and emitted from the beam selecting system 20C. In this embodiment, only one beam is selected among the beams A through D, and emitted from the beam selecting system 20C.

FIG. 5 shows a condition where the optical switch 41 reflects the beam B toward the mirror 48, the optical switch 42 reflects the beam C toward the mirror 49, and the optical switch 43 reflects the beam reflected by the mirror 48 (i.e., the beam B) so that it is emitted from the beam selecting system 20C.

In the second and third embodiments, the beam emitted by the light source is firstly divided into a plurality of beams, and then, the beams are modulated to have different wavefront curvatures. Then, at least one of the beams having different wavefront curvatures is selected using the optical switches. However, the invention need not be limited to this configuration. For example, the optical switches may be arranged on the upstream side of the system for modulating the wavefront curvature of the beams. In particular, if an optical switch coupled to an optical fiber is used, it is difficult to switch the beams with maintaining the wavefront curvatures of the incident beams. In such a case, it is necessary that the optical switches are arranged on the upstream side of the system modulating the wavefront curvature of the beams.

The invention is not limited to the first through third embodiments described above, and various modification can be made without departing from the scope of the invention. For example, the number of beams divided by the light beam generator 10 is not necessarily be four, and the number of the divided beams can be less or more than four.

The light source 11 may be omitted and the beam generator 10 may be configured to receive a light beam from an external device, and generates a plurality of beams having different wavefront curvatures.

MODIFICATION OF LENS SYSTEM

Next, an example of a modified configuration of the lens systems 13, 15, 17 and 19 will be described with reference to FIG. 6.

FIG. 6 shows a modified lens system 50 which may replace each of the lens systems 13, 15, 17 and 19. The lens system 50 includes two convex lenses 51 and 53, each having a focal length of f. The lenses 51 and 53 are arranged in the X-axis direction. The lens 51 is provided with an actuator 52, and is configured to be movable in the X-axis direction. That is, by driving the actuator 52, the lens 51 moves with respect to the lens 53 so that a distance between the lenses 51 and 53 varies. If a distance between the principal point of the lens 51 and the focal point of the lens 53 is represented by fe, the lens 51 is moved such that $0 < fe \leq f$ is satisfied. When fe is equal to f, the beam incident on the lens 51 is converged on the focal point of the lens 53. In this case, the beam incident on the lens 53 is collimated thereby, and accordingly, the wavefront curvature is substantially zero. When the fe is smaller (i.e., if the lens 51 approaches the lens 53), the focal point of the lens 51 is closer to the lens 53 than its focal point. Accordingly, the beam emerges from the lens 53 as a diverging beam. Thus, the wavefront curvature is larger as the lens 51 approaches the lens 53. With this configuration, by moving the lens 51, the wavefront curvature can be varied, or adjusted.

If each of the lens systems 13, 15, 17 and 19 is replaced with the lens system 50, the wavefront curvatures of the four beams generated by the beam generators 10 can be adjusted depending on the images to be observed. For example, if images at a relatively distant location are to be observed, the radii of the wavefront curvatures of the four beams may be set to 10 cm, 30 cm, 50 cm and 1 m, while if image at a relative close location are to be observed, the radii of the wavefront curvature of the four beams may be set to 1 m, 3 m, 5 m and the infinity. With such a control, the natural perspective can be provided.

Next, with reference to FIG. 7, the entire system of a retinal displaying device 80, to which the WCM 1 according to each of the embodiments is applicable, will be described.

Figure 7:
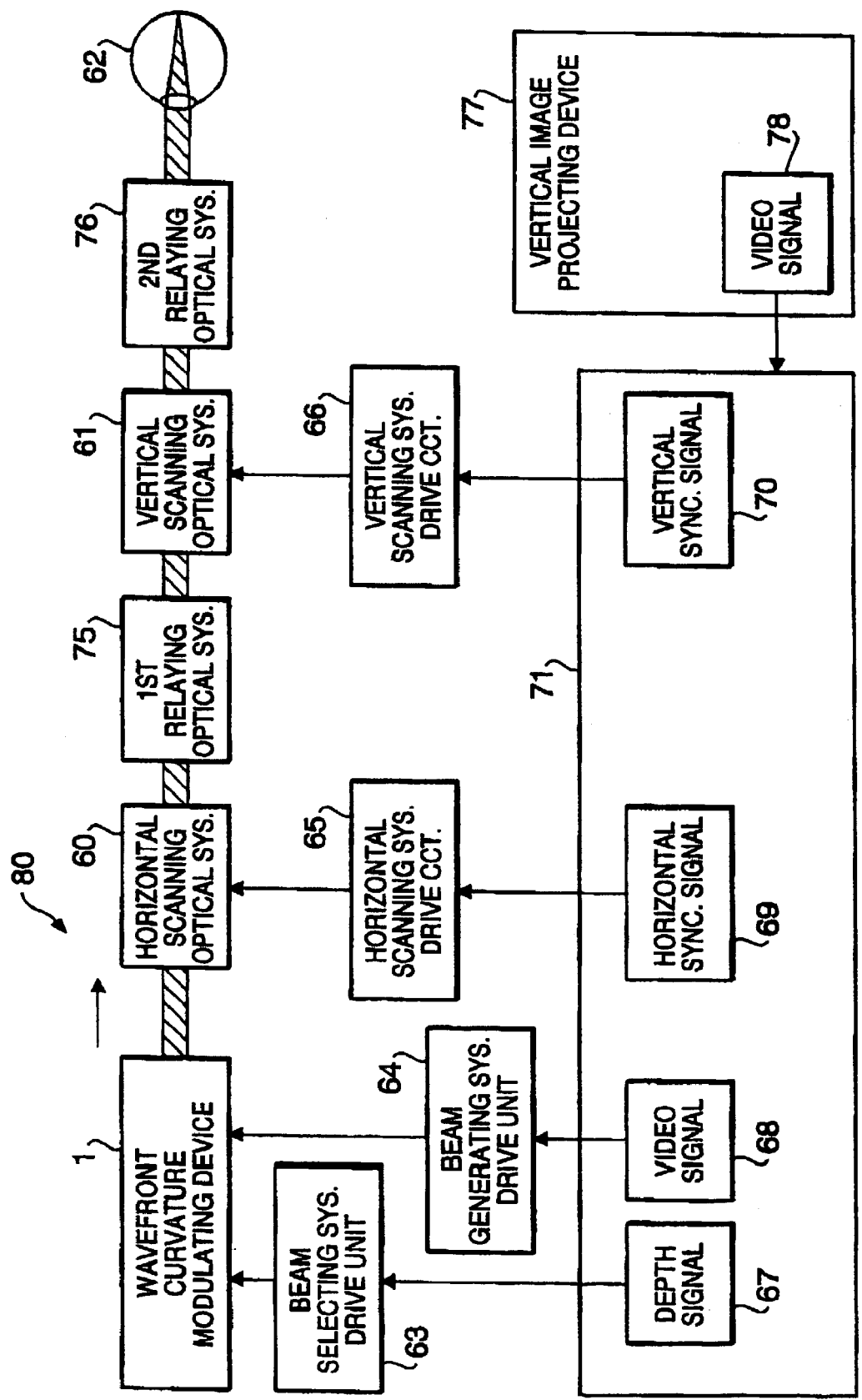
FIG. 7 is a block diagram showing a configuration of a retinal scanning display device.

As shown in FIG. 7, the retinal displaying device 80 includes a video signal supplying unit 71, which receives video signals 78 from a virtual image projection device 77. The virtual image projection device 77 analyses a three-dimensional object image, and generates two-dimensional images in accordance with the depth of the three-dimensional image. The virtual image projection device 77 outputs a video signal 78, which is input to the video signal supplying unit 71.

The video signal supplying unit 71 generates, based on the received video signal 78, a video signal 68, a depth signal 67, a horizontal synchronizing signal 69 and a vertical horizontal signal 70, which are input to the beam selecting system drive circuit 63, a beam generating system drive circuit 64, a horizontal scanning system drive circuit 65, and a vertical scanning system drive circuit 66, respectively.

The beam selecting system drive circuit 63 and the beam generating system drive circuit 64 drive the WCM 1. Specifically, when the beam generating system drive circuit 64 receives the video signal 68 from the video signal supplying unit 71, the beam generating system drive circuit 64 generates a driving voltage to drive the beam generating system 10 (see FIG. 2), and applies the same to the beam generating system 10. Then, as described above, the light source 11 of the beam generating system 10 emits the light beam, which is divide into four beams having different wavefront curvatures.

The beam selecting system drive circuit 63 generates, when it receives the depth signal 67, a driving voltage to drive the beam selection system 20 (see FIG. 3), and applies the same to the beam selection system 20 (20A, 20B or 20C). Then, at least one of the beams output by the beam generating system 10 is selected, which is emitted by the WCM 1 and directed to the horizontal scanning system 60.

The horizontal scanning system drive circuit 65 drives the horizontal scanning system 60. Similarly, the vertical scanning system 66 drives a vertical scanning system 61.

The horizontal scanning system 60 is provided with a polygonal mirror (not shown) which deflects the incident beam to scan in the main scanning direction. The polygonal mirror is driven to rotate as a driving voltage generated by the horizontal scanning system drive circuit 65 is applied. The horizontal scanning system drive circuit 65 generates the driving voltage so that the polygonal mirror rotates synchronously with the horizontal synchronizing signal 69.

The beam scanned by the horizontal scanning system 60 is incident on a vertical scanning system 61 through a first relaying optical system 75.

The vertical scanning system 61 is provided with a galvano mirror (not shown) which deflects the beam scanned by the polygonal mirror to further scan in the auxiliary scanning direction. The galvano mirror is driven to rotate as a driving voltage generated by the vertical scanning system drive circuit 66 is applied. The vertical scanning system drive circuit 66 generates the driving voltage so that the galvano mirror swings synchronously with the vertical synchronizing signal 70.

The beam two-dimensionally scanned by the horizontal scanning system 60 and the vertical scanning system 61 is directed to an eye 62 of the observer through a second relaying optical system 76, and the image is formed on the retina of the observer.

Figure 8:
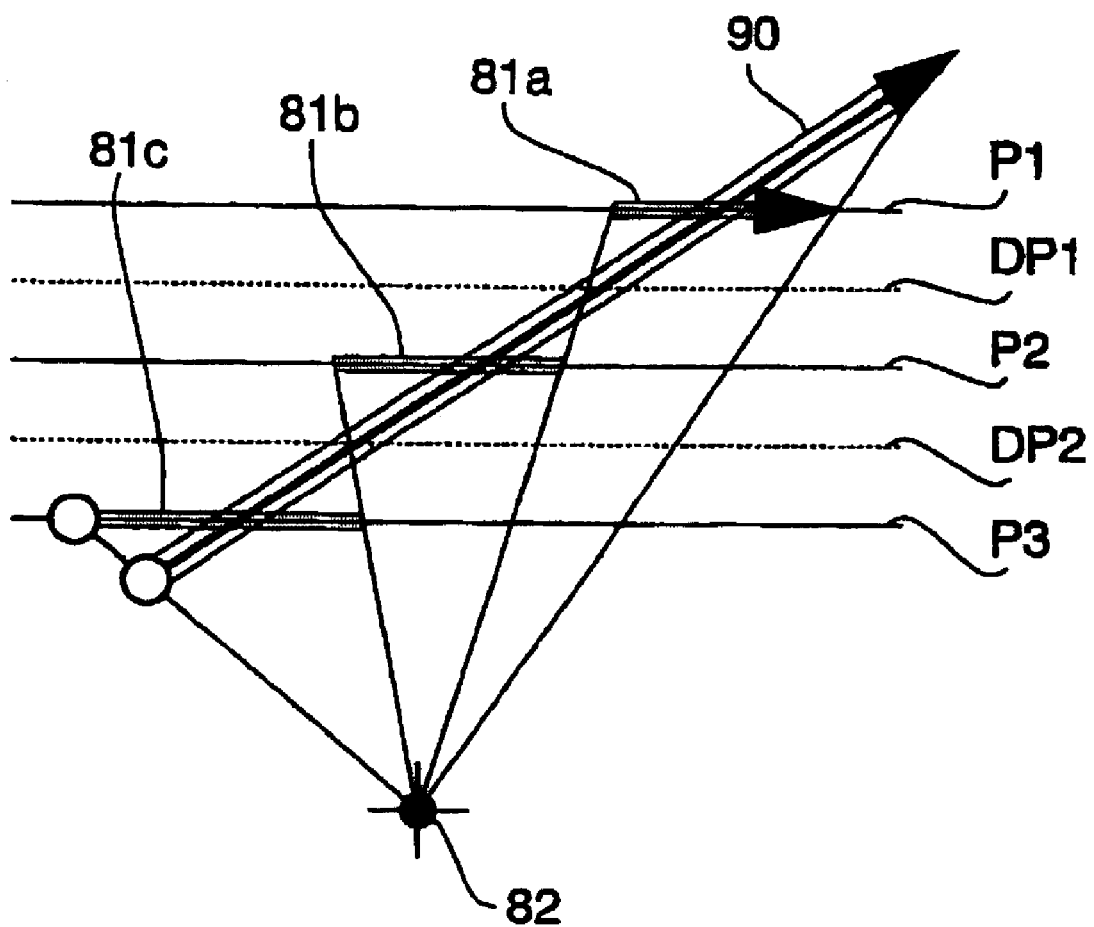
FIG. 8 illustrates a principle of generating a group of two-dimensional image data at different depths.

FIG. 8 shows processing of the three-dimensional image by the virtual image projection device 77.

According to the embodiments, the virtual image projection device 77 generates a group of two-dimensional image data at different image planes by projecting a three-dimensional image on virtual image planes. In FIG. 8, the up-and-down direction of the drawing is referred to as a Z-axis direction, right-and-left direction is referred to as the X-axis direction, and a direction perpendicular to the plane of FIG. 8 is referred to as the Y-axis direction.

Initially, the virtual image projection device 77 analyzes a three-dimensional model 90 in order to realize a three-dimensional image on the retina of the observer.

In this example, the virtual image projection device 77 defines three virtual planes P1, P2 and P3 in the depth direction (i.e., the Z-axis direction) of the three-dimensional object model 90. Each of the virtual planes P1, P2 and P3 is a plane perpendicular to the Z-axis (i.e., an X-Y plane). A dividing plane DP1 is defined as a plane at an intermediate position between the virtual planes P1 and P2, and another dividing plane DP2 is defined as a plane at an intermediate position between the virtual planes P2 and P3.

The three-dimensional object model 90 is divided into three pieces in the Z-axis direction with the dividing planes DP1 and DP2. Then, the virtual image projection device 77 projects the three-dimensional object model 90 onto the virtual planes P1, P2 and P3 based on a positional relationship between the three-dimensional object model 90 and a virtual observing point 82. The virtual observing point 82 is a point from which the observer observes the three-dimensional object model 90 when the image of the three-dimensional object model 90 is projected on the retina of the observer. By projecting the images representing the positional relationship between the virtual observing point 82 and the three-dimensional object model 90, it is possible to make the observer feel as if the three-dimensional object model 90 is observed at the virtual observing point 82.

The virtual image projecting device 77 projects a portion of the three-dimensional object model 90 located on the virtual observing point side with respect to the dividing plane DP2 when viewed from the virtual observing point 82 on the virtual plane P3, i.e., a projected image 81c is generated.

Similarly, the virtual image projecting device 77 projects a portion of the three-dimensional object model 90 located between the dividing planes DP1 and DP2 when viewed from the virtual observing point 82 on the virtual plane P2, i.e., a projected image 81b is generated.

Further, the virtual image projecting device 77 projects a portion of the three-dimensional object model 90 located on a side opposite to the virtual observing point 82 with respect to the dividing plane DP1 (i.e., the +Z side) when viewed from the virtual observing point 82 on the virtual plane P1, i.e., a projected image 81a is generated.

Then, the virtual image projection device 77 processes the three projected images 81a, 81b and 81c as a single image having three different depths, and generates the video signal 78 representing such an image, which is transmitted to the video signal supplying unit 71. As described above, the thus generated and transmitted video signal 78 is processed and the image representing the three-dimensional object model 90 is formed on the retina of the observer.

It should be noted that the number of the virtual planes is not limited to three, and two or more than three planes may be employed.

Further, the positions of the virtual planes P1-P3 are determined based on the size of the three-dimensional object model 90. This can be modified such that distances between the virtual planes may be determined based on the depth of the three-dimensional object model 90 so that when an image combining the three projected images is projected on the retina of the observer, the degree of blur of the images on the virtual planes P1 and P3 due to the out-of-focus state thereof becomes substantially the same. For example, the distances between the virtual planes P1-P3 are determined such that, assuming that the eye of the observer focuses on an image on the virtual plane P2, the degrees of the blurs, at the retina of the observer, of the images on the virtual planes P1 and P2 are substantially the same.

Alternatively, distances between the virtual planes may be determined so that the degrees of blurs of the images on the virtual planes P1 and P3 with respect to the image on the virtual plane P2 become substantially the same in terms of a visual resolution of the observer.

The configuration of the retinal display device 80 shown in FIG. 8 can be modified such that the video signal supplying unit 71 merges the video signal 78 output by the virtual image projection device 77 and another video signal output by a not shown external device, and image corresponding to the merged signals may be formed on the retinal of the observer. In this case, the signal transmitted from the external device is not limited to a signal which does not include the depth signal, but the image data including the depth signal or data representative of a three-dimensional shape expressed by polygons.

Optionally, the retinal display device 80 may configured to include a plurality of WCMs for generating, for example, Red, Green and Blue component beams whose wavefront curvatures are modulated. With such a configuration, a color image can be formed on the retina of the observer.

It should be noted that, for each image pixel, the wavefront curvatures of the R, G and B beams are generally considered to be substantially the same. Therefore, instead of employing three WCMs for respective color components, only one WCM may be employed and arranged such that the R, G and B beams are combined and then enter the single WCM.

The present disclosure relates to the subject matter contained in Japanese Patent Application No. 2002-029037, filed on Feb. 6, 2002, which is expressly incorporated herein by reference in its entirety.

What is claimed is:

1. A retinal display device having a wavefront curvature modulating device, said wavefront curvature modulating device including:
   a beam generating system that emits a plurality of beams having different wavefront curvatures; and
   a beam selecting system that selects at least one of the beams generated by said beam generating system.

2. The retinal display device according to claim 1, further including:
   a scanning system that scans the beam emitted by said wavefront curvature modulating device; and
   an optical system that directs the beam scanned by said scanning system into an eye of an observer.

3. The retinal display device according to claim 1, further including a virtual image projection device that generate image data representative of a three-dimensional object by projecting the three-dimensional object on a plurality of virtual planes at different distances with respect to a virtual observing point representing an observing point of the observer.

4. The retinal display device according to claim 3, wherein when the observer focuses on one of the plurality of virtual planes, distances to two planes closer to and farther from the one of the plurality of virtual planes are determined such that blurs of the images formed on the two planes due to out-of-focus state thereof are substantially the same.

5. The retinal display device according to claim 3, wherein when the observer focuses on one of the plurality of virtual planes, distances between the plurality of virtual planes are determined such that a blur of the image formed on the virtual plane next to the one of the plurality of virtual planes substantially corresponds to the visual resolution of the observer.

6. The retinal display device according to claim 3, wherein said virtual image projecting device projects, in addition to the two-dimensional images projected on the plurality of virtual planes, image data including depth data and/or image data of three-dimensional shape represented by polygons on the virtual planes.

7. The retinal display device according to claim 3, wherein said virtual image projecting device projects portions of a three-dimensional object viewed from the virtual observing point on one of the plurality of virtual planes corresponding to a distance between the observing point to the portion of the three-dimensional object.

8. The retinal display device according to claim 3, wherein said beam selecting system includes a plurality of intensity modulators that modulates intensities of the plurality of beams generated by said beam generating system, respectively.

9. The retinal display device according to claim 3, where said beam selecting system includes a beam combining system capable of combining the plurality of beam into a single combined beam.

10. The retinal display device according to claim 3, wherein said beam selecting system includes an optical switch system that selects at least one of the plurality of beams.

11. The display device according to claim 3, wherein said beam generating system includes a wavefront curvature modulating system capable of modulating the wavefront curvatures of the plurality of beams individually.

12. The retinal display device according to claim 11, wherein said wavefront curvature modulating system is capable of modulating a radius of wavefront curvature within a range of 10 cm through the infinity using the plurality of beams.

13. The retinal display device according to claim 1, wherein said beam generating system includes:
   a plurality of laser sources that emit a plurality of laser beams, respectively; and
   a plurality of wavefront curvature modulating systems that modulate the plurality of laser beams emitted by said plurality of laser sources so as to have different wavefront curvature, respectively.

* * * * *